United States Patent [19]

Kuntze

[11] Patent Number: 4,884,761

[45] Date of Patent: Dec. 5, 1989

[54] LINE BAIL, AS WELL AS THE ASSOCIATED FISHING REEL

[76] Inventor: Rupert Kuntze, Kudowastrasse 9, 1000 Berlin 33 (West), Fed. Rep. of Germany

[21] Appl. No.: 14,488

[22] Filed: Feb. 13, 1987

[30] Foreign Application Priority Data

Feb. 14, 1986 [DE] Fed. Rep. of Germany ....... 3604700

[51] Int. Cl.⁴ ............................................. A01K 89/01
[52] U.S. Cl. .................................................. 242/235
[58] Field of Search ...................... 242/84.2 G, 84.2 R, 242/84.2 C

[56] References Cited

U.S. PATENT DOCUMENTS 4,171,108 10/1979 Ishida .............................. 242/84.2 G

FOREIGN PATENT DOCUMENTS 1096590 6/1955 France .
1452862 8/1966 France .

Primary Examiner—Stuart S. Levy
Assistant Examiner—Katherine Matecki
Attorney, Agent, or Firm—Toren, McGeady & Associates

[57] ABSTRACT

A line bail is pivotally mounted on a reel part rotatable about the longitudinal axis of a fishing reel. The line bail is formed of a fiber reinforced plastics material and is elongated in the direction of the longitudinal axis, that is, in its pivoting direction. As compared to its sides extending in the elongated direction, the ends of the bail are narrow. A fishing line on the reel glides over one end of the bail as the bail pivots from a released position to a line capturing position. The one end is rounded with a radius of curvature which is as large as possible and it is formed of a smooth surfaced wear resistant plastics material.

9 Claims, 4 Drawing Sheets

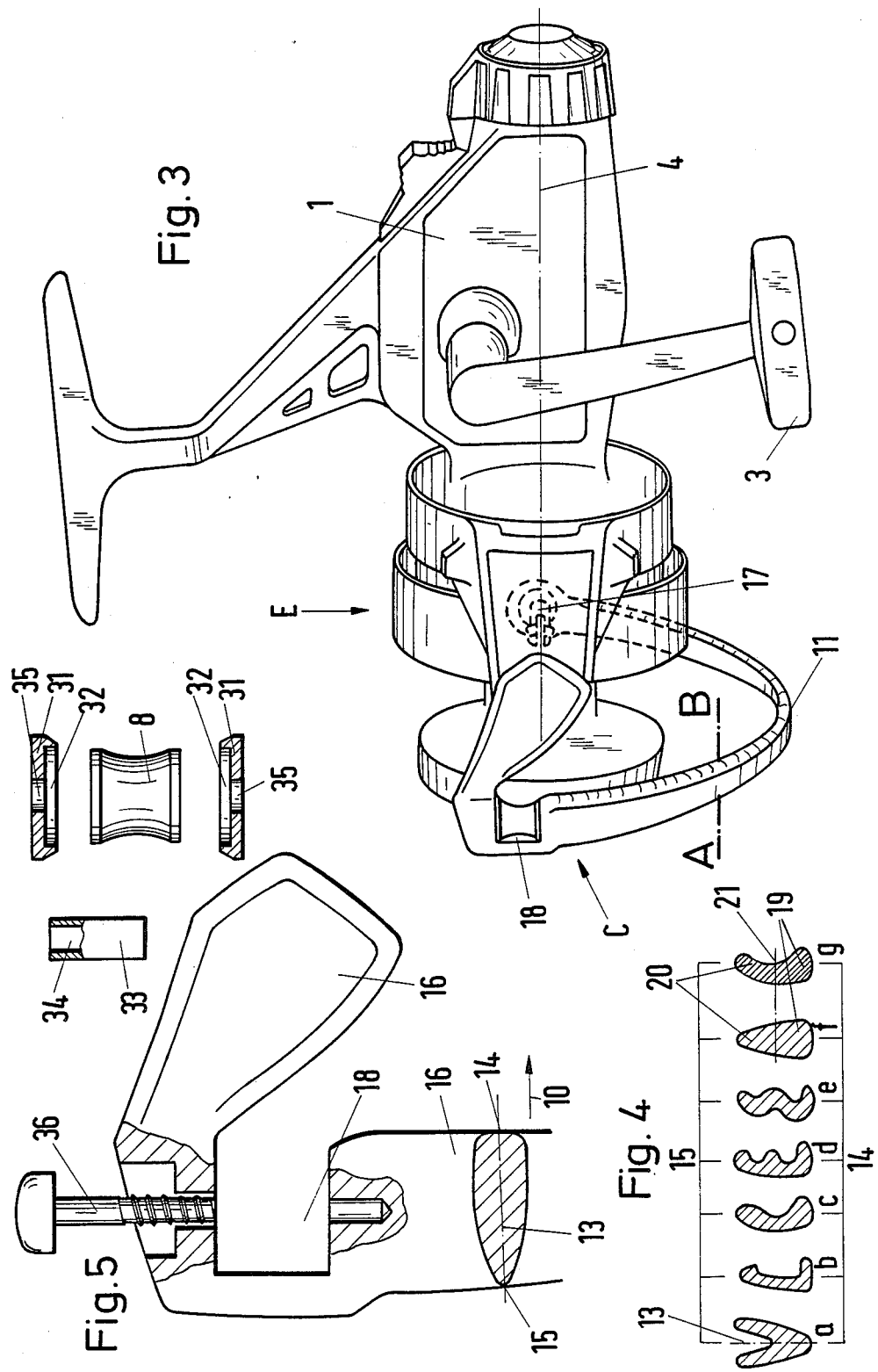

LINE BAIL, AS WELL AS THE ASSOCIATED FISHING REEL

BACKGROUND OF THE INVENTION

1. Field of the Invention

The invention is directed to a line bail for fishing reels which is pivotally articulated at a reel part rotatable around the reel longitudinal axis. Previously, this line bail was formed of a bent wire of circular cross-section. Two support elements were pivoted at the reel part rotatable around the reel longitudinal axis. One of these support elements carried a line guide roller at which one of the wire bail ends was fastened. The other wire bail end was fastened to the other support element. This arrangement has several disadvantages. In order to achieve a tension-free state of the bail for the roller operation, the wire bail has to be bent very accurately into the shape provided for this. This is very difficult in view of the springy elasticity of the wire material. Thus tensions can arise at the bearing points in case of inaccurate bending. Fabrication and bending of the wire parts, the separate support elements and the connections of the wire ends with the support elements involves very expensive fabrication. The stability of the wire bail cannot be increased, unless it is made with an appropriately thick cross-section, whereby however disadvantages involving a higher weight and the therewith connected increased costs for the compensation of the imbalance would result. With a relatively small cross-section of the wire bails, damage of the fishing line is possible.

2. Description of the Related Art

A bail is known from the FR-PS No. 1 096 590, in which soft plastic is sprayed around a so-called core or inner reinforcement consisting of a piano string. This fabrication is very expensive since the piano string must be held to be free in the mold and accessible from the sides, so that the plastic material can be sprayed all around it. In addition, a soft plastic piece is here unsuitable since it will be ground up by the relatively thin fishing line or damaged by the fishing line cutting into it. This bail is circular in cross-section and therefore does not have a large resistance moment in the direction it is stressed by the fishing line.

A bail consisting of sheet metal is known from the FR-PS No. 1 452 862, whose cross-section is approximately U-shaped. The fabrication of this bail is also expensive, since the sheet metal has to be formed in several production stages. This applies especially to the attachment forces of the bail to the fishing reel. The side edge of the above-mentioned U-shaped cross-section in contact with the fishing line is relatively sharp- edged and thus can lead to damage of the fishing line. On the other hand the task of this invention consists into designing a bail which can be pivotally mounted in or pivotally articulated at a reel part rotatable around the reel longitudinal axis in such a way that functional or operational improvements can be achieved with a simplified and thus more economic fabrication.

SUMMARY OF THE INVENTION

In accordance with the present invention a bail designed without a separate core or insert of a piano string can be fabricated simply and accurately in the desired shape from plastics material possible with fiberglass or carbon fiber reinforcement. Thus the balancing problems are avoided. The disadvantages explained in connection with the above-mentioned French patent publications are avoided. In view of the state of the art discussed at the beginning the lower specific weight of plastics material compared to steel wire is of essential significance for reduction of the overall weight of the fishing reel, but especially for the reduction of the weight of the rotating parts of the fishing reel. The oblong cross-section of the bail, wherein the long longitudinal cross-sectional axis extends in its pivoting direction, imparts a sufficient stability to the bail with a relatively small expenditure of material and an additional reduction in weight. The line bail according to the invention substitutes one part for the three parts hitherto required, namely the wire bail and the two support elements. The stability of the line bail can be further increased in the preferred embodiment form from fiber reinforced plastic or from another high quality plastic with the cross-section remaining constant and thus with the weight remaining constant. The line bail consisting of plastics material, contrary to what is the case with a bent wire bail, does not have an inherent tension, it can be accurately matched through its shaping achieved by spraying to the dimensions and distances of the support points at the rotatable reel portion and can be fastened at the reel portion. The plastics material does not damage the fishing line as easily as the material steel wire. The large bending radius of the corresponding narrow side of the line bail prevents pinching or damage to the fishing line. Thus the fishing line is appropriately conserved.

For the rest of it additional advantages and features of the invention can be discerned from the claims as well as the description which follows and the pertinent drawing of the embodiment possibilities in the invention.

BRIEF DESCRIPTION OF THE DRAWINGS

FIG. 3 is a view of the fishing reel similar to FIG. 1 in perspective, however, without the fishing line, FIGS. 4a to 4g show different cross-sectional shapes of the line bail along the section line A-B in FIG. 3 at a magnified scale, FIG. 5 is a view of the line bail at an enlarged scale, according to arrow C in FIG. 3, partially in cross-section.

DETAILED DESCRIPTION OF THE INVENTION

Figure 1:
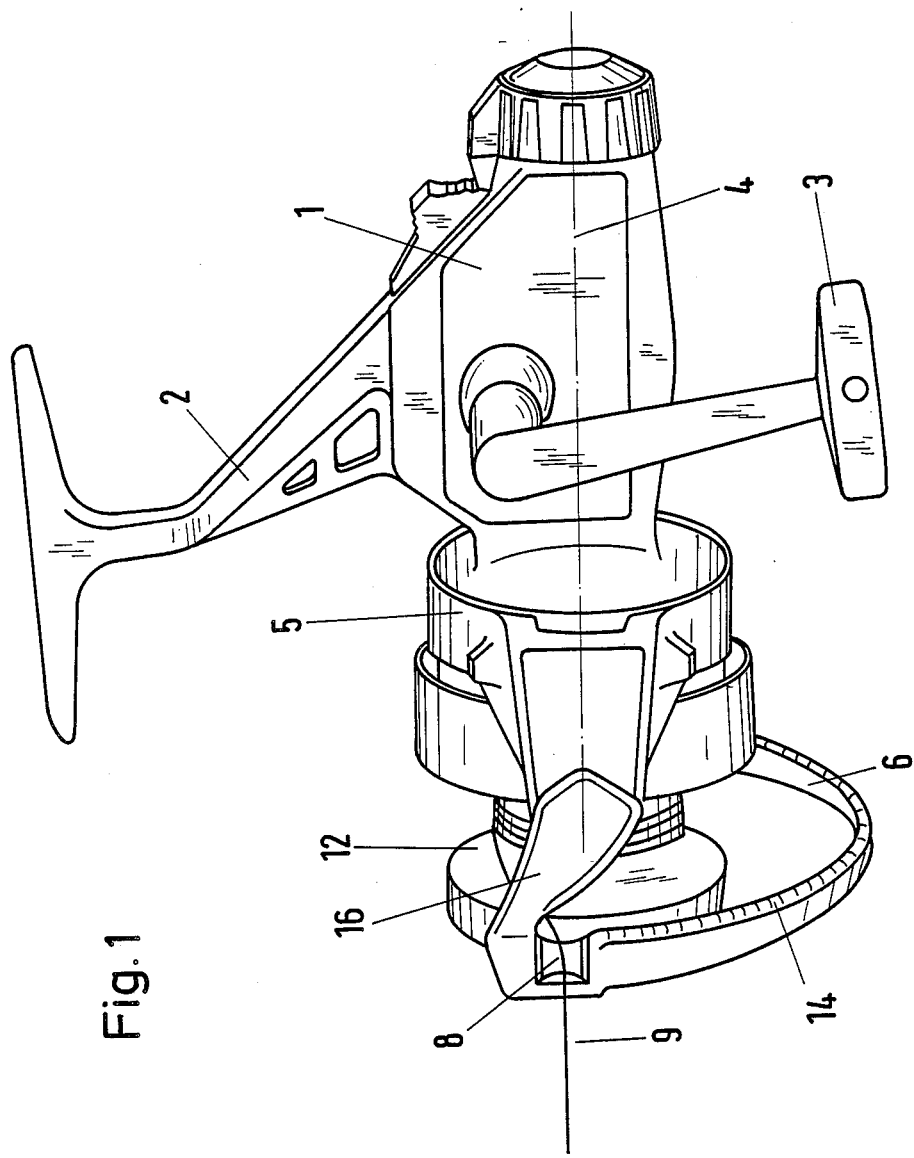
FIG. 1 is a fishing reel with line bail in perspective with the bail in closed position.

The fishing reel 1 with handle 2 and rotating crank 3 for reeling in of the fishing line 9 comprises a part 5 rotatable around the fishing reel longitudinal axis 4. The line bail 6 still to be explained in detail is pivotably articulated around the axis 7. (see FIG. 6) at the rotatable part 5. The line guide roller 8 for the fishing line 9 is located at line bail 6. In the position of the line bail in FIG. 2 same releases the fishing line 9. By appropriate actuation of the rotating crank 3 said bail can be pivoted in direction of the arrow 10 and grips herein with its narrow side 14 the fishing line 9. This pivoting motion is continued until the closed line capturing position in FIG. 1 is attained. In this position the fishing line 9 has slid along the narrow side 14 until it has come to rest on the guide face of the line guide roller 8, in which the fishing line can be reeled in by means of the rotating crank 3 and can be wound up on the line spool 12.

The above-named function and the basic structure of such a fishing reel is known. The novel feature of the fishing reel is the design of the line bail with support arms and attachment (pivotal attachment) of the support arms at the reel rotating part 5, as has already been depicted in FIGS. 1 and 2 and which embodiment will be explained in detail later.

The line bail 6 is entirely made of plastics and in one piece across its entire length. A fiber reinforced plastics material or another high quality plastics material (for instance polyacetal) is preferred for this purpose. It has an oblong cross-section (see FIGS. 4 and 5), wherein the long axis 13 of this cross-section (see FIG. 4a and FIG. 5) extends in pivoting direction 10 (see FIG. 2 and FIG. 5).

The embodiment according to FIG. 4f is a preferred embodiment hereof. The depicted cross-sections show that the narrow first end surface 14 of the line bail cross-section, across which the fishing line 9 slides during transition from the position in FIG. 2 into the position in FIG. 1, is rounded off. Thus it has a larger radius of curvature than the comparatively more pointed opposite narrow second end surface 15 which lies at the other cross-sectional end. As can be seen in FIG. 4f, a pair of side surfaces extend between the first and second end surfaces.

Because of this shape of the cross-section the fishing line on the one hand is conserved during the sliding process at the narrow side 14. On the other hand the oblong and preferably pointed cross-sectional shape at the narrow side 15 gives the line bail a relatively high stability with a relatively small mass of the plastics material, especially an increase in bending strength in direction of the arrow 10.

By spraying plastics material in a mold for forming the line bail 6 and the support arm 16 at the same time, with the support arm 16 supporting the line guide roller 8, and with the other end 17 of the line bail 6 serving for the pivotable attachment or support at the reel rotating part 5, the bail and support arm can be formed or sprayed in a mold in one piece. The plastics material may be polyacetate or nylon. It is advisable for reasons of bending strength that the cross-section of the line bail increases from its center 11, note FIG. 3, towards its ends, means at one end the receiving opening 18 for the line guide roller 8 and at the other end its support point 17. The line bail as viewed from the side can have not only the semicircular shape depicted in the drawing, but also a trapezoidal shape, consisting of two somewhat shorter sides, which converge slightly and a longitudinal side connecting these, which extends approximately parallel to the previously names axis 7.

In FIGS. 4a to 4e, different cross-sectional shapes of the line bail 6 are shown. In FIG. 4a, the cross-section is generally V-shaped with the first end surface 14 forming the apex of the V-shape. FIG. 4b is generally L-shaped. FIG. 4c is generally C-shaped, and FIGS. 4d and 4e are generally E-shaped. The first end surface 14 in each of FIGS. 4b to 4e is wider than the second end surface 15.

It is also possible in another embodiment to assemble the line bail 6 from two plastics parts, which have been designated with the numerals 19 and 20 in the FIGS. 4f and 4g, which are bonded to each other along the respective broken dotted line 21 and preferably are welded or fused together. They constitute in the final result a line bail 6 in one piece. Herein the plastics part 19 guiding the fishing line is formed of a particularly smooth and wear-resistant material, for instance polyacetal/teflon or graphite. Contrary to that the plastics part 20 is made of a tough elastic plastics material, for instance polyacetal, nylon possibly fiber reinforced for the purpose of attaining an appropriately high stablity. Both plastics parts 19, 20 extend across the entire length of the bail 6 between its ends.

Figure 2:
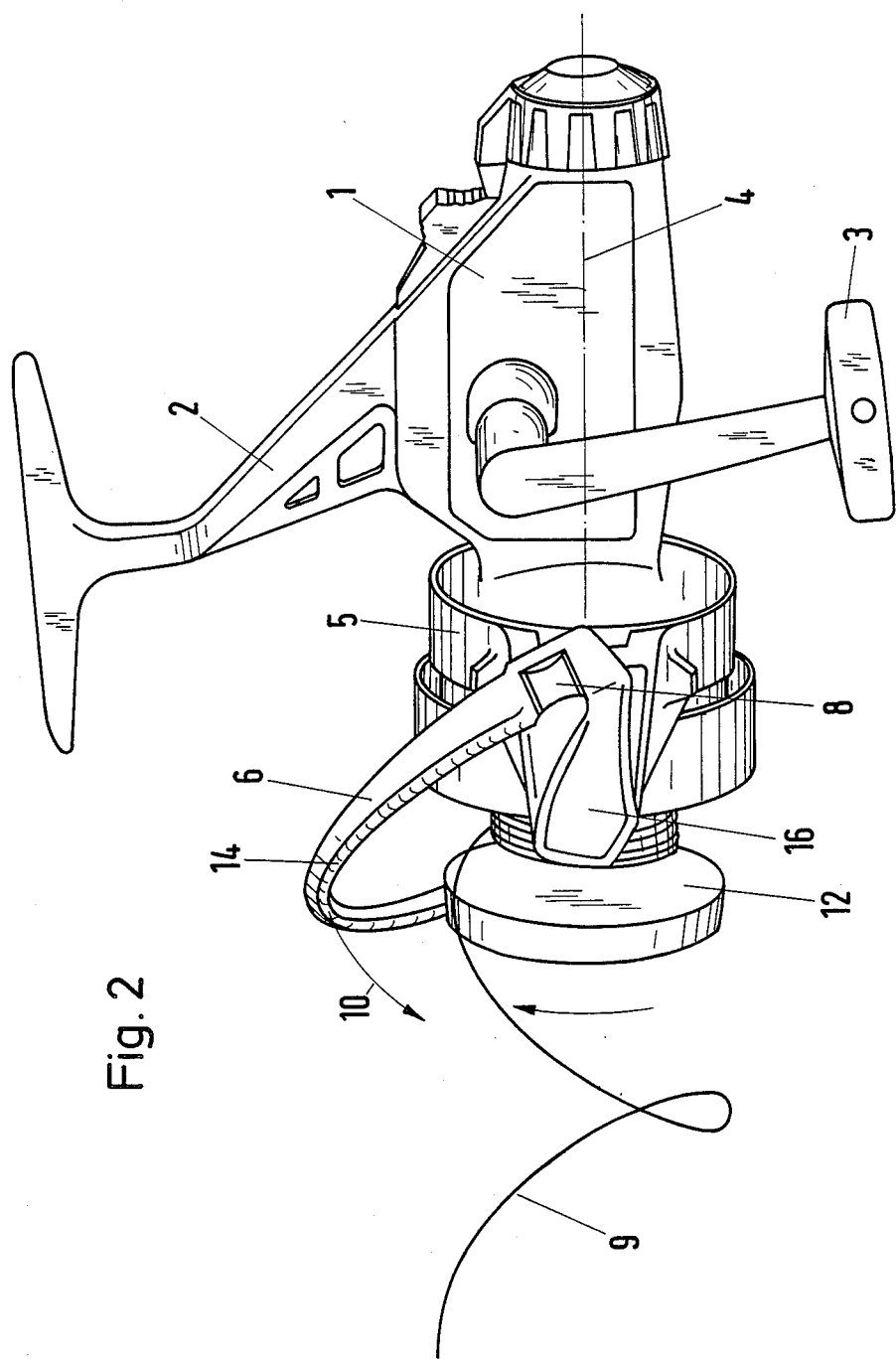
FIG. 2 is the fishing reel according to FIG. 1, wherein the line bail assumes a position releasing the fishing line.

Stop edges not separately depicted in the drawing can be provided in the region of the support arm 16 and the bail end 17, which correspond and coact with stop edges at the rotatable reel part 5 in such a way that they define the two end positions of the line bail according to FIG. 1 and FIG. 2.

Figure 6:
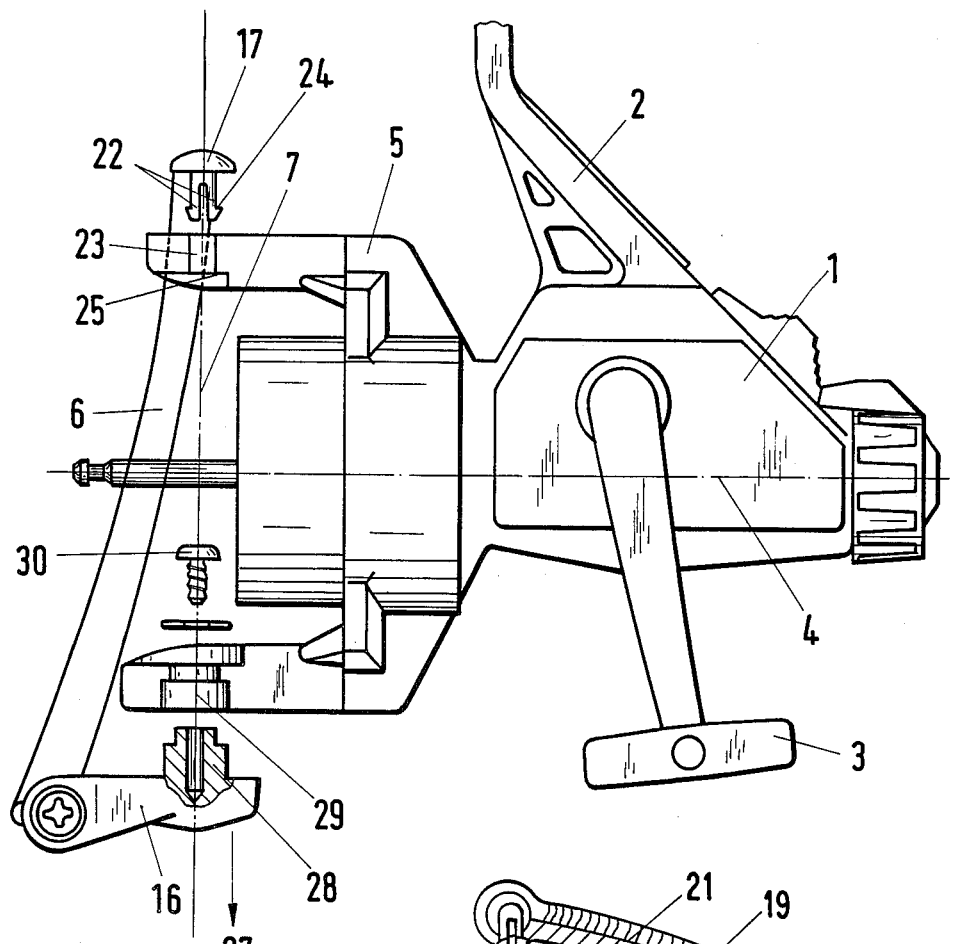
FIG. 6 shows a view of the fishing reel in the direction of arrow E in FIG. 3 with the line bail in a position prior to its being connected with the fishing reel.
Figure 7:
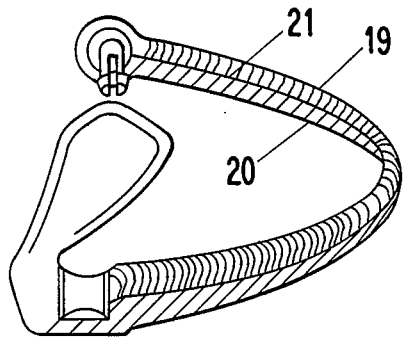
FIG. 7 shows the line bail detached from the fishing reel.

According to FIG. 6 the line bail can be retained at least at one end, namely the end 17 by a snap-in - or push-to-lock connection 22 at or behind a bore 23 of the rotatable reel part 5. For this purpose the snap-in or push-to-lock 22 consists of two arms bendable towards each other which are provided with barbs 24, in the inserted position these barbs rest against the inner face 25 of the part 54. The support arm 16 can by slight bending in direction of the arrow 27 be inserted with its extension or collar 28 into the appropriate opening 29 of the part 5 and can be secured therein by a screw 30.

The line guide roller 8 is supported in the already mentioned recess 18 (see in particular FIGS. 3 and 5). Two support shells 31 can serve for this, in whose recesses 32 the line guide roller rotates. A bearing bushing 33 is provided inside the line guide roller. Its bore 34 and the bores 35 of the support shell 31 are penetrated by fastening screws 36. Thus a very stable but at the same time smoothly rotatable support of the line bail 6 is achieved.

All depicted and described features as well as their mutual combination are essential to the invention to the extent to which they have not been explicitly designated as being known.

I claim:

1. Line bail for a fishing reel having a longitudinal axis and a reel part rotatable about the longitudinal axis, said line bail is pivotally mounted on said reel part for pivotal movement about a pivot axis extending transversely of the longitudinal axis, wherein the improvement comprises that the line bail (6) is formed completely of a plastics material, said line bail has a first end and a second end each pivotally mounted on said reel part with a bail part extending between said first and second ends generally in the direction of the pivot axis, said bail part has an oblong cross-section between said first and second ends thereof and the cross-section is elongated in the direction transverse to the pivot axis of said line bail and the oblong crosssection has a first end surface and a second end surface spaced apart by side surfaces in the elongated direction, said first and second end surfaces being narrow as compared with said side surfaces extending between the first and second end surfaces, said bail being pivotally displaceable between a release position and a lien capturing position for a fishing line on said fishing reel with the fishing line gliding over the first end surface in the pivotal movement between the release position and the capturing position, said second end surface having a rounded shape and, said first end surface being rounded and having a radius of curvature greater than said second end surface and said first end surface being wider than said second end surface, and at least said first end surface being formed of a smooth surfaced wear resistant plastics material.

2. Line bail, as set forth in claim 1, wherein said line bail (6) is formed of a fiber reinforced plastics material.

3. Line bail, as set forth in claim 1, wherein said line bail (6) includes a support arm (16) forming one of the first and second end of said line bail, said support arm is formed monolithically with said line bail.

4. Line bail, as set forth in claim 3, wherein a line guide roller (8) is rotatably supported in a recess (18) in said support arm (16).

5. Line bail, as set forth in claim 4, wherein said line guide roller (8) has an axis of rotation, a support shell (31) at each opposite end of said roller and a bearing bushing (33) extending through said line guide roller between said support shells, and said support shells and said bearing bushing supporting the line guide roller.

6. Line bail, as set forth in claim 1, wherein the cross-section of said line bail decreases from the first and second ends thereof along said bail part.

7. Line bail, as set forth in claim 1, wherein said line bail extending between the first and second ends thereof is formed of two separate plastics parts (19, 20) with said plastic parts being bonded to one another, whereby one plastic part (19) forms the first end surface and is formed of a smooth surfaced wear resistant plastics material and the other plastics part (20) is formed of a tough elastic plastics material.

8. Line bail, as set forth in claim 1, including means for forming a snap-in attachment of said line bail to said reel part.

9. Line bail, as set forth in claim 1, wherein means located at one end of said line bail (6) for providing a snap-in connection to said reel part and means at the other end of said line bail for providing a screw connection to said reel part.

* * * * *